United States Patent [19]

Foster

[11] Patent Number: 4,679,538
[45] Date of Patent: Jul. 14, 1987

[54] DUAL FUEL ENGINES

[75] Inventor: Joseph S. Foster, West Vancouver, Canada

[73] Assignee: Pro-Staff Fuels Ltd., West Vancouver, Canada

[21] Appl. No.: 936,712

[22] Filed: Dec. 1, 1986

[51] Int. Cl.[4] .......................................... F02M 21/02
[52] U.S. Cl. ................. 123/525; 123/276 E; 123/575; 123/51 R
[58] Field of Search ................... 123/527, 27 GE, 525, 123/575, 51 R

[56] References Cited

U.S. PATENT DOCUMENTS

| 2,686,503 | 8/1954 | Reddy et al. | 123/27 GE |
| 4,091,772 | 5/1978 | Heater et al. | 123/27 GE |
| 4,527,516 | 7/1985 | Foster | 123/525 |

Primary Examiner—E. Rollins Cross
Attorney, Agent, or Firm—Fetherstonhaugh & Co.

[57] ABSTRACT

An improved gas injection system for uniflow dual fuel engines having a plurality of cylinders, a piston in each cylinder, inlet ports arranged around each cylinder to be uncovered by downward movement of the piston in the cylinder is disclosed. It is comprised of a seal located in one inlet port and a reed valve assembly connected to the inlet port via the seal. An inlet pipe connected to the reed valve assembly is adapted to be connected at its distal end to a gas source. An air inlet pipe is connected between the port seal and the reed valve assembly for feeding air therebetween such that when the piston closes the one inlet port, air from the air inlet pipe will close the reed valve to prevent further flow of gas.

4 Claims, 4 Drawing Figures

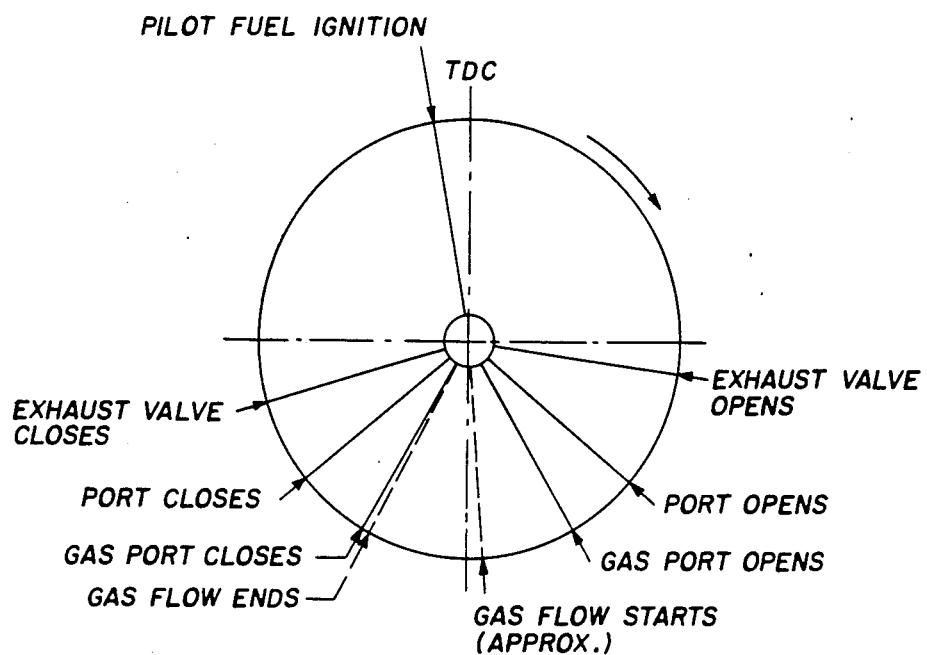

DUAL FUEL ENGINES

FIELD OF THE INVENTION

This invention relates to uniflow dual duel engines and more particularly to an improved gas injection system.

DESCRIPTION OF THE PRIOR ART

U.S. Pat. No. 4,527,516 which issued to J. S. Foster on July 9, 1985, discloses a uniflow two cycle dual fuel engine. As disclosed in this patent, the prolonged scavenge period of the two cycle engine results in some unburned methane being carried over into the exhaust system to the detriment of the engines overall thermal efficiency, when operating in the dual fuel mode.

The present invention provides a significant improvement in the fuel efficiency of this type of engine.

SUMMARY OF THE INVENTION

It is therefore an object of the present invention to provide an improved gas injection system which will achieve improved thermal efficiency.

Another object of the present invention is to provide an improved gas injection system able to prevent the seepage and loss of gas around the piston/port area, thereby improving the efficiency of the piston acting as a gas injection valve.

Yet another object of the present invention is to provide an improved gas injection system able to control and delay the timing of gas injection into combustion chamber, thereby reducing the interval of time available for methane to mix with scavenge air and hence be carried unburnt into the exhaust system.

Accordingly, the present invention provides an improved gas injection system for uniflow dual fuel engines having a plurality of cylinders, a piston in each cylinder, inlet ports arranged around each cylinder to be uncovered by downward movement of the piston in the cylinder, comprising:

a seal located in one inlet port;

a reed valve assembly connected to said inlet port via said seal;

an inlet pipe connected to said reed valve assembly and adapted to be connected at its distal end through a gas source; and an air inlet pipe connected between said port seal and said reed valve assembly for feeding air therebetween such that when said piston closes said one inlet port, air from said air inlet pipe will be such as to close said reed valve to prevent flow of gas.

DRAWINGS

Particular embodiments of the invention will be understood in conjunction with the accompanying drawings in which:

FIG. 4 illustrates the typical timing diagram for a uniflow two cycle diesel engine modified according to the present invention.

DESCRIPTION OF THE PREFERRED EMBODIMENTS

Figure 1:
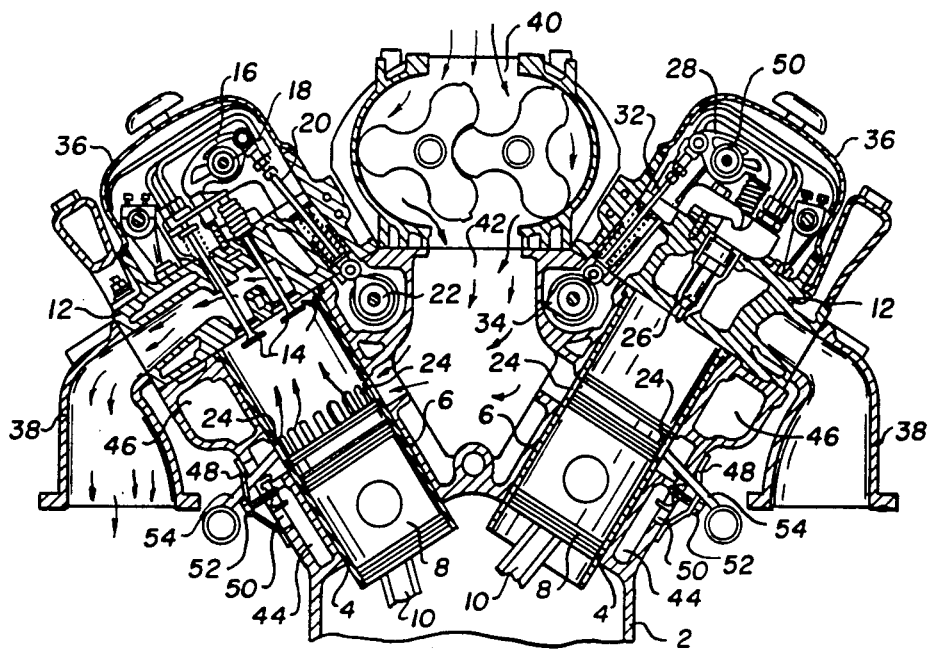
FIG. 1 is a section through a conventional uniflow two cycle diesel engine, modified for use with dual fuel.

The two cycle diesel engine illustrated in FIG. 1 is disclosed in U.S. Pat. No. 4,527,516 and is to be considered as fully as if set forth herein. In the present invention, the gas inlet pipe 54 shown in FIG. 1 which extends from the exterior of the engine to and practically flush with the interior of the cylinder 6, adjacent the piston 8 for the majority of piston travel, is replaced by the improved gas injection system shown in FIG. 2.

Figure 2:
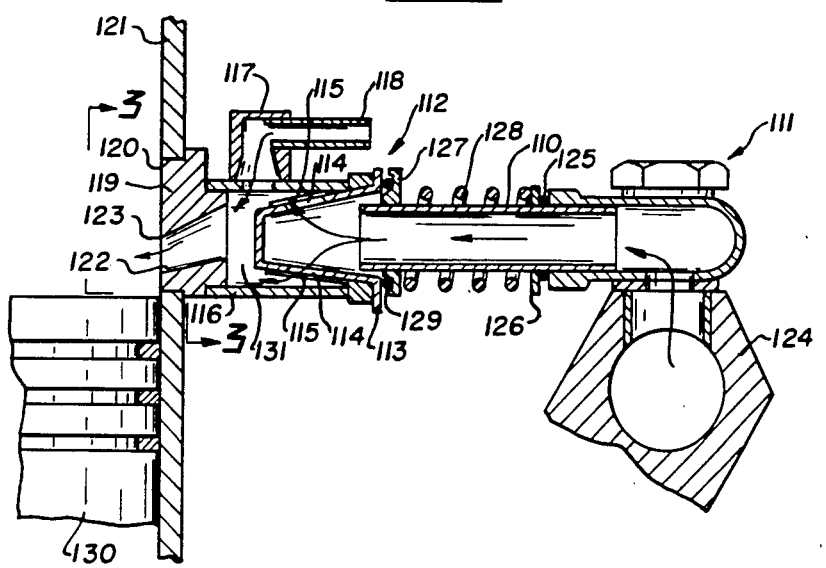
FIG. 2 is a sectional detail of the improved gas injection system of the present invention.
Figure 3:
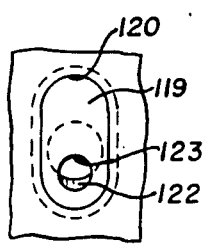
FIG. 3 is a view taken along line 3—3 in FIG. 2.

As shown in FIGS. 2 and 3, the gas inlet pipe 110 now extends between a banjo fitting assembly 111 and a reed valve assembly 112. The reed valve assembly comprises a truncated conical shaped fitting 113 having a set of openings 114 made closeable by means of a set of baffles 115 adapted to cover openings 114.

Reed valve assembly 112 is fitted to an adaptor 116 provided with an air inlet fitting 117 connectable to a rigid or flexible air line 118. Adaptor 116 is connected to port seal 119 received within the inlet port 120 of cylinder liner 121. Port seal 119 is provided with an inlet 122 located such that upper edge 123 is spaced substantially below the upper edge of the inlet port 120. Banjo fitting assembly 111 is secured to header 124 leading to a source of fuel gas, for example propane or natural gas, the latter being preferred. As shown in FIG. 2 there is shown an O-ring 125 around pipe 110 located between a washer 126 and banjo fitting assembly 111. Washer 126 is a slide fit on pipe 110 and there is a fixed annular flange 127 located on pipe 110. Spring 128 is located between washer 126 and flange 127 to apply mild pressure to O-ring 125 and O-ring 129 located between flange 127 and fitting 113.

In operation, when piston 130 has passed the opening 122 of port seal 119, air entering chamber 131 from the air inlet 117 will create a higher pressure than gas pressure from header 124 and pipe 110, baffles 115 will therefore rest against openings 114 of fitting 113 thereby shutting off the flow of gas.

As piston 130 approaches the lower end of its stroke, it uncovers the opening 122 of port seal 119, allowing air from air inlet 117 to flow into the combustion chamber. The subsequent drop in seal air pressure in chamber 131 allows the reed valve assembly 112 to open, thus permitting gas to flow into the combustion chamber. As piston 130 rises and covers the opening 122 of port seal 119, air pressure in chamber 131 rises, closing reed valve assembly 112, again shutting off the gas flow.

Accordingly, it can be seen that air pressure arriving from the air inlet 117 can be used to control the timing and flow of gas into the combustion chamber of the engine.

The engine's overall thermal efficiency is therefore improved in two ways. By shutting off the flow of gas while the piston is above the port opening 122, the seepage and loss of gas around the piston/port area is prevented. That is to improve the efficiency of the piston to act as a gas injection valve. Also, by providing a means of controlling and delaying the timing of gas injection into the combustion chamber, the interval of time available for methane to mix with scavenge air and hence be carried unburnt into the exhaust system is reduced.

The engine timing diagram shown in FIG. 4 emphasizes that the valve timing of the engine is not in any way changed by the use of the improved fuel injection system. The valve timing diagram is entirely conventional and no further explanation is believed necessary.

Extensive research tests have established and shown that the present invention improves the thermal efficiency of the engine overall load and speed ranges. Similarly, it has been shown that the practical and commercial aspects of this improvement reduces the "payback" period on the initial capital investment necessary to cover conversion cost.

As will be apparent to those skilled in the art in light of the foregoing disclosure, many alterations and modifications are possible in the practise of this invention without departing from the spirit or scope thereof. Accordingly, the scope of the invention is to be construed in accordance with the substance defined by the following claims.

I claim:

1. An improved gas injection system for uniflow dual fuel engines having a plurality of cylinders, a piston in each cylinder, inlet ports arranged around each cylinder to be uncovered by downward movement of the piston in the cylinder, comprising:

a seal located in one inlet port;

a reed valve assembly connected to said inlet port via said seal;

an inlet pipe connected to said reed valve assembly and adapted to be connected at its distal end to a gas source; and an air inlet pipe connected between said port seal and said reed valve assembly for feeding air therebetween such that when said piston closes said one inlet port, air from said air inlet pipe will close said reed valve to prevent further flow of gas.

2. An improved gas injection system as defined in claim 1 wherein the gas inlet port extends at an angle to the axis of the cylinder so that gas admitted to the cylinder is directed toward the piston when the latter is in its bottom dead centre position.

3. An improved gas injection system as defined in claim 2 wherein said reed valve assembly comprises a truncated conical fitting having a set of openings closeable by means of a set of baffles laid across the openings.

4. An improved gas injection system as defined in claim 3 wherein said air inlet pipe is mounted on an adaptor connected between said seal and said reed valve assembly.

* * * * *